May 12, 1942.     C. W. ASHLEY     2,282,691
TANK GAUGE
Filed Nov. 13, 1939
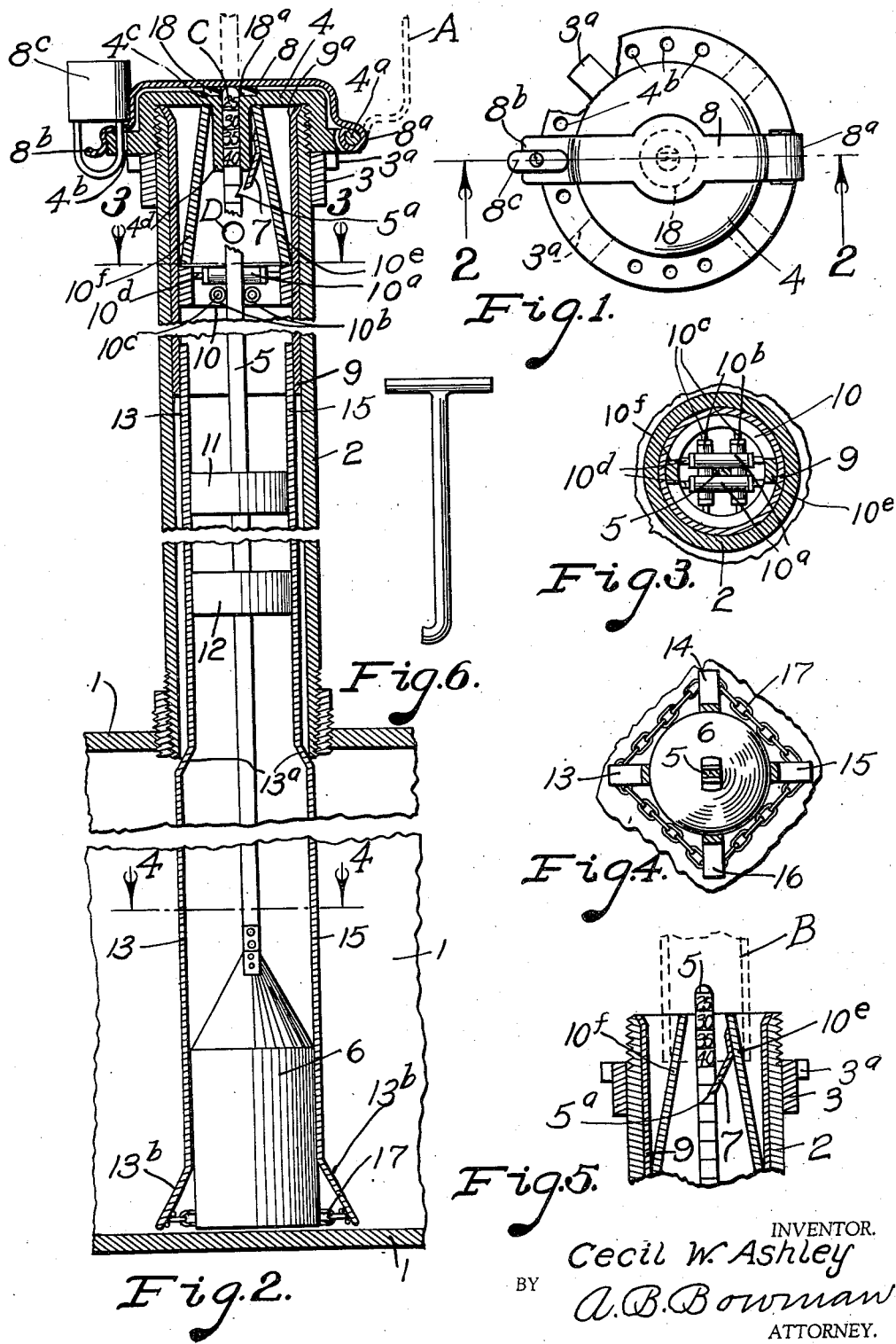
INVENTOR.
Cecil W. Ashley
BY A. B. Bowman
ATTORNEY.

Patented May 12, 1942

2,282,691

UNITED STATES PATENT OFFICE 2,282,691

TANK GAUGE

Cecil W. Ashley, El Centro, Calif.

Application November 13, 1939, Serial No. 304,179

6 Claims. (Cl. 73—322)

My invention relates to a tank gauge, more particularly for use in connection with underground gasoline tanks or the like; also to certain improvements over the structure as disclosed in my former application for Letters Patent, Serial No. 295,433, and the objects of my invention are:

First, to provide a tank gauge of this class which provides means for determining the amount of liquid in an underground tank, so that a leak in said tank will be quickly detected, thereby saving the continued loss of liquid therefrom;

Second, to provide a tank gauge of this class in which angularly extending members are arranged to support a supply nozzle in the fill pipe and around the upper end of the gauge member thereby protecting said gauge member from possible damage while filling the tank with which my tank gauge is connected;

Third, to provide a tank gauge of this class in which the gauge member thereof is supported in a plurality of spaced aligned roller bearings and is effectively guided whereby friction and possible catching of said gauge member is reduced to a minimum;

Fourth, to provide a tank gauge of this class in which the float guide members are held in position by means of a chain interconnecting said guide members thereby preventing the float from exerting lateral force on any single guide member without the support of the other guide members in connection with said chain;

Fifth, to provide a tank gauge of this class in which a gasket member prevents foreign matter from entering the tank fill pipe around the path of the gauge member of my tank gauge; and Sixth, to provide a tank gauge of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a top or plan view of my tank gauge showing a portion broken away to facilitate the illustration; Fig. 2 is a longitudinal fragmentary sectional view thereof together with the tank taken from the line 2—2 of Fig. 1 showing parts and portions in elevation and portions broken away to facilitate the illustration; Fig. 3 is a fragmentary transverse sectional view taken from the line 3—3 of Fig. 2; Fig. 4 is a fragmentary transverse sectional view taken from the line 4—4 of Fig. 2; Fig. 5 is a sectional view similar to that of Fig. 2 showing the fill pipe cap of my tank gauge removed and also showing by dash line B a conventional supply nozzle inserted in the upper end of the tank fill pipe and Fig. 6 is a side elevational view of a special tool for removing portions of my tank gauge.

Similar characters of reference refer to similar parts and portions throughout the several views of the drawing.

The tank 1, tank fill pipe 2, tank fill pipe collar 3, tank fill pipe cap 4, gauge member 5, gauge member float 6, gauge member retainer spring 7, gauge member retainer cover 8, sleeve and guide member support 9, gauge member bearing supports 10, 11 and 12, float guide members 13, 14, 15 and 16, guide member supporting chain 17 and the gasket member 18 constitute the principal parts and portions of my tank gauge.

The tank 1 is of conventional form and screw threaded in the upper side thereof is a tank fill pipe 2 which is substantially of conventional tank fill pipe form.

Fixed on this tank fill pipe 2 near its upper end is a tank fill pipe collar 3, adjacent to which is positioned the tank fill pipe cap 4. This tank fill pipe cap 4 is screw threaded on the upper end of the tank fill pipe 2 and is provided with a journal portion 4a at its one side on which is shiftably mounted one end of the gauge member retainer cover 8. The opposite end of said cover 8 is arranged to snap over the edge of the tank fill pipe cap 4 and is provided with a hole in its angular portion in which the shank of padlock 8c is positioned, it being noted that a corresponding hole 4b in the tank fill pipe cap 4 is also arranged to receive the shank portion of the padlock 8c thereby permitting the retainer cover 8 to be locked into engagement with the cap 4, as shown best in Fig. 2 of the drawing.

Positioned in a recessed portion 4c in the upper side of the fill pipe cap 4 is a gasket member 18 which is substantially ring shaped and which is arranged to be engaged by the lower side of the retainer cover 8, as shown best in Fig. 2 of the drawing. It will be noted that when the padlock 8c is removed from the fill pipe cap 4 and the retainer cover 8, said retainer cover 8 may be shifted to the dash line position A, as shown in Fig. 2 of the drawing, permitting the gauge member 5 to rise upwardly through a central hole 18a in the gasket member 18.

Integral with the fill pipe cap 4 is a downwardly extending guide portion 4d which is substantially of hollow cylindrical shape and shiftably mounted centrally therein is the upper end of the gauge member 5. This gauge member 5 extends downwardly therefrom and secured on the lower end thereof is the gauge member float 6, the lower portion of which is substantially of hollow cylindrical shape and the upper end of which is substantially of conical shape. This gauge member float 6 is engageable with liquid in the tank 1 and is arranged to force the gauge member 5 upwardly by means of its buoyance in proportion to the amount of liquid in said tank 1. The gauge member 5 is shiftably supported in the gauge member bearing supports 10, 11 and 12 by means of the roller bearings 10a and 10b positioned in said bearing supports 10, 11 and 12, as shown best in Figs. 2 and 3 of the drawing. These roller bearings 10a and 10b are revolubly mounted on the shafts 10d and 10c, respectively, which are welded or otherwise secured to the inner side of each of the bearing supports 10, 11 and 12, it being noted that the roller bearings 10a are positioned at opposite sides of the gauge member 5 and that the roller bearings 10b are positioned at opposite edges of the gauge member 5 in crossed relation to the roller bearings 10a, as shown best in Figs. 2 and 3 of the drawing.

Welded or otherwise secured on the upper side of the bearing support 10 are two angularly extending members 10e and 10f the upper ends of which are positioned at opposite sides of the portion 4d of the tank fill pipe cap 4. Secured on the inner side of the member 10e is the gauge member retainer spring 7. This gauge member retainer spring 7 extends downwardly and inwardly toward a notch portion 5a in the gauge member 5, it being noted that the downwardly extending portion 4d of the fill pipe cap 4 engages said retainer spring 7 and holds it out of engagement with the notch portion 5a when the fill pipe cap 4 is in the position as shown in Fig. 2 and is arranged to shift inwardly by means of its resilient character and engage the notch portion 5a of the gauge member 5 when the fill pipe cap 4 is removed from the fill pipe 2 as shown in Fig. 5 of the drawing.

The sleeve and guide member support 9 is substantially hollow and cylindrical in shape and is rigidly positioned in the upper end of the fill pipe 2. It is provided with an angular flange portion 9a at its upper end which engages a conforming portion in the upper end of the fill pipe 2. Secured by welding or otherwise on the inner side of this sleeve and guide member support 9 is the gauge member bearing support 10. Secured on the inner side of said sleeve and guide member support 9 at its lower end are the float guide members 13, 14, 15 and 16. These float guide members 13, 14, 15 and 16 are secured on the outer side of the annular bearing supports 11 and 12, as shown best in Fig. 2. Each of said float guide members is provided with an angularly disposed portion 13a, as shown in Fig. 2 of the drawing, and an angularly extending lower end portion 13b on the under side of which is secured the guide member supporting chain 17. Said angularly disposed portions 13a are arranged to engage the lower end of the fill pipe 2 thereby holding said float guide members in rigid position relative to said fill pipe 2. The guide member supporting chain 17 is arranged to support the guide members 13, 14, 15 and 16 in unison so that any tendency of the gage member float 6 to move laterally relatively to said guide members will be curbed by means of the guide member supporting chain 17 in connection with all four of the float guide members.

The operation of my tank gauge is substantially as follows:

Assuming that the tank 1 is partially filled with liquid, the gauge member float 6 tends to rise upwardly in proportion to the amount of liquid in the tank 1 and when it is desired to measure the liquid in said tank, the gauge member retainer cover 8 is shifted to the dash line position A, as shown in Fig. 2 of the drawing, and the gauge member 5, in connection with the gauge member float 6 passes upwardly through the opening 18a of the gasket member 18 until the float 6 has reached a level corresponding with the amount of liquid in said tank 1. The operator of my tank gauge may then determine the amount of liquid in the tank by means of the graduated scale C on the gauge member 5, as indicated in Fig. 2 of the drawing as it projects above the upper side of the gasket member 18. The gauge member 5 is then forced downwardly into the tank fill pipe 2 and the gauge member retainer cover 8 is snapped over the edges of the fill pipe cap 4 by means of its resilient end portion 8b thereby holding the gauge member 5 downwardly in the fill pipe 2. The lock 8c is only used in connection with this gauge member retainer cover 8 when it is desired to lock the same securely on the fill pipe cap 4, it being noted that when said lock 8c is in the position as indicated in Fig. 2 of the drawing, the shank portion thereof is positioned between the outwardly extending lug portions 3a of the tank fill pipe collar, thereby preventing the tank fill pipe cap 4 from being unscrewed and removed from the tank fill pipe 2. When it is desired to replenish the supply of liquid in the tank 1, the tank fill pipe cap 4 is unscrewed from the fill pipe 2 and removed therefrom. When the portion 4d in connection with the cap 4 is moved out of engagement with the gauge member retainer spring 7, said spring 7 moves inwardly engaging the notch portion 5a of the gauge member 5, thereby retaining the gauge member 5 substantially in the position as shown in Fig. 5 of the drawing. A conventional supply nozzle is placed over the upper end of the angular members 10e and 10f and liquid is thereby supplied to the tank 1. Said supply nozzle, as shown by dash lines in Fig. 5 of the drawing, is held in such a position on the members 10e and 10f that the gauge member 5 is protected from possible damage by said supply nozzle.

When it is desired to remove my tank gauge from the tank fill pipe 2, a special tool, as shown in Fig. 6, is inserted in the hole D which is positioned in the side of the sleeve and guide member support 9, as shown in Fig. 2 of the drawing. Said tool engaging said hole D provides means for pulling the sleeve and guide member support 9 out of the tank fill pipe tube thereby removing the float guide members in connection therewith and other parts of my tank gauge, it being noted that the angularly disposed portions 13a of the float guide members are arranged to spring inwardly so that they may be removed from the tank 1 through the fill pipe 2.

When inserting my tank gauge into the fill pipe of a conventional underground tank, the float and gauge member is first inserted into the fill pipe and the float guide members are then inserted in the fill pipe 2 and forced downwardly into the tank 1 and over the conical upper end of the float 6.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a tank gauge of the class described, the combination with a liquid tank provided with an extensive vertical fill pipe, of a sleeve support secured in the upper end of said fill pipe, a plurality of float guide members secured thereto and extending downwardly to near the bottom of said tank, a float reciprocably mounted in said float guide members, a chain interconnecting the lower ends of said float guide members providing collapsible connected relation of said float guide members relatively to each other, and a rigid gauge member secured on said float and extending upwardly therefrom.

2. In a tank gauge of the class described, the combination with a liquid tank provided with an extensive vertical fill pipe, of a sleeve support secured in the upper end of said fill pipe, a plurality of float guide members secured thereto and extending downwardly to near the bottom of said tank, a float reciprocably mounted in said float guide members, a chain interconnecting the lower ends of said float guide members providing collapsible connected relation of said float guide members relatively to each other, a rigid gauge member secured on said float and extending upwardly therefrom, and a cap secured over the upper end of said sleeve support and provided with a central opening in which said gauge member is reciprocably mounted.

3. In a tank gauge of the class described, the combination with a liquid tank provided with an extensive vertical fill pipe, of a sleeve support secured in the upper end of said fill pipe, a plurality of float guide members secured thereto and extending downwardly to near the bottom of said tank, a float reciprocably mounted in said float guide members, a chain interconnecting the lower ends of said float guide members, a rigid gauge member secured on said float and extending upwardly therefrom, a cap secured over the upper end of said sleeve support and provided with a central opening in which said gauge member is reciprocably mounted, said cap being provided with a downwardly extending guide portion for guiding said gauge member and a retainer spring arranged to be engaged by said guide portion and disengaged from said gauge member when said cap is screwed onto the fill pipe, said spring being arranged to engage a notch portion of said gauge member when said cap is removed.

4. In a tank gauge of the class described, the combination with a liquid tank and a vertically positioned fill pipe thereon, of a plurality of separate resilient float guide members in said fill pipe and extending downwardly in said tank, a float reciprocably mounted in said guide members, a rigid gauge member supported on said float, a plurality of roller bearings on which said gauge member is supported intermediate its ends and gauge member bearing supports on which said roller bearings are mounted.

5. In a tank gauge of the class described, the combination with a liquid tank and a vertically positioned fill pipe thereon, of a plurality of separate resilient float guide members in said fill pipe and extending downwardly in said tank, a float reciprocably mounted in said guide members, a rigid gauge member supported on said float, a plurality of roller bearings on which said gauge member is supported intermediate its ends and gauge member bearing supports on which said roller bearings are mounted, and upwardly and angularly extending members secured on the uppermost gauge member bearing support adapted to engage a supply nozzle when it is inserted in said vertically positioned fill pipe.

6. In a tank gauge of the class described, the combination of a liquid tank, a fill pipe for said tank and open framework means internally of said fill pipe in converging disposition toward and near the end of said fill pipe adapted to engage a supply nozzle when it is inserted in said fill pipe.

CECIL W. ASHLEY.